United States Patent Office 2,857,555
Patented Oct. 21, 1958

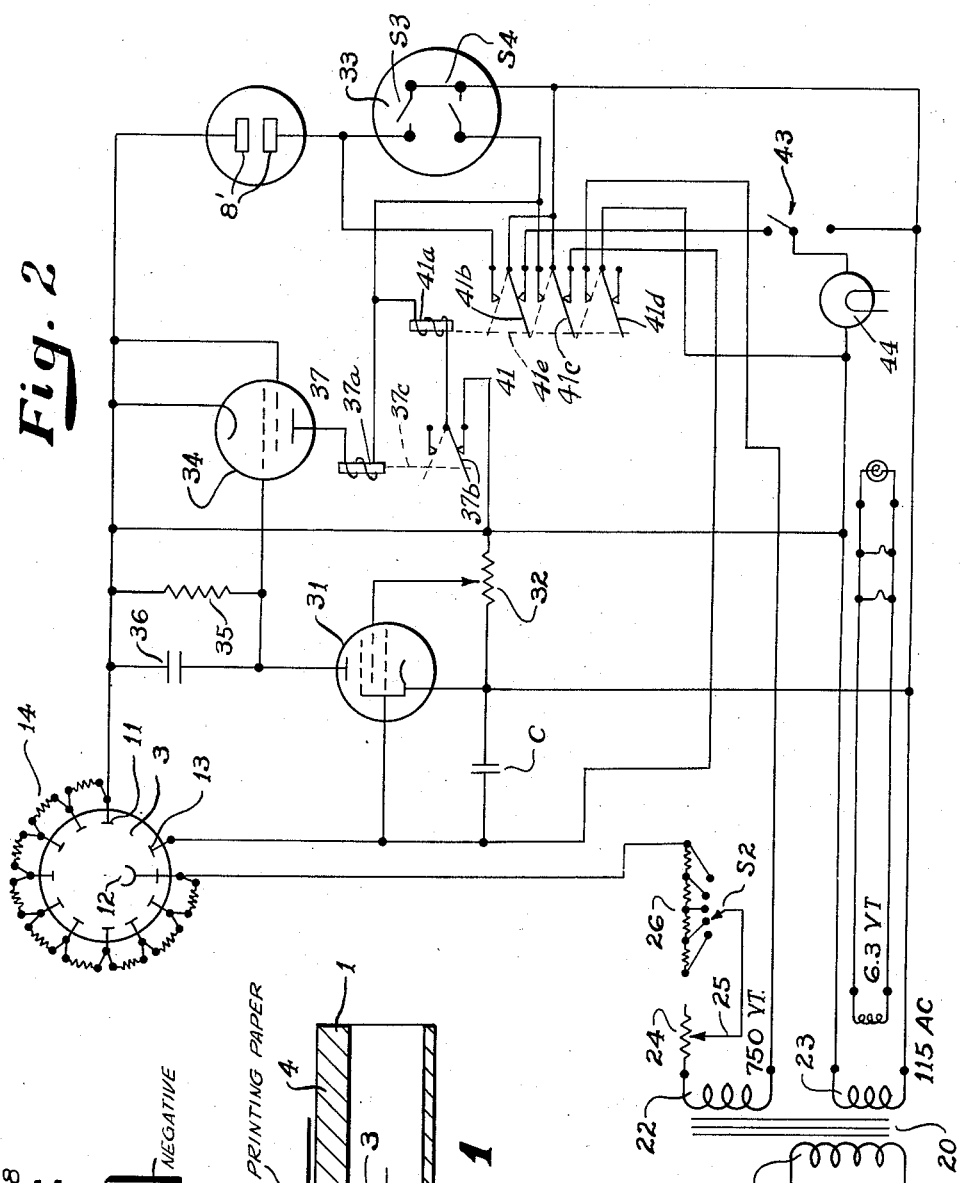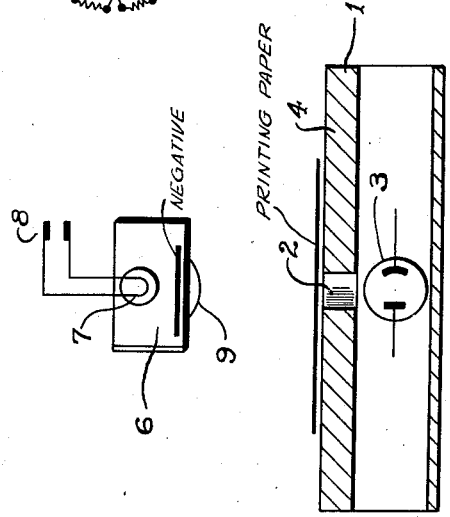

2,857,555

EXPOSURE TIMING FOR USE WITH PHOTOGRAPHIC PRINTING APPARATUS

Floyd Koen and Wesley Duncan Ellison, Lubbock, Tex.

Application October 20, 1953, Serial No. 387,180

2 Claims. (Cl. 315—151)

This invention relates to automatic control of a light source and particularly to timer apparatus for automatically controlling the exposure period in photographic projection printing. The invention will hereinafter be described and illustrated in connection with automatic control of a light source for photographic equipment, but it is to be understood that the control device may be utilized for other purposes.

The timing of photographic projection prints has always been basically a process of trial and error, as even with the most intricate interval timers, the settings on the timers depended to a great extent on the operator and his decision as to the length of time a given negative should be exposed. As is well known in the art, the operator makes this decision taking into consideration the relative density of the negative, the amount of light supplied by the enlarger and the sensitivity of the projection printing paper being used, and only after an actual exposure had been made and the tests developed was the operator certain that his decision would be satisfactory to produce the desired results.

It is an object of this invention to provide apparatus for the control of exposure in photographic projection printing wherein the decision of an operator as to the exposure time is not required and all mechanical operations and manipulations are automatic regarding exposure time.

It is a further object of this invention to provide improved apparatus for automatically controlling the exposure period in photographic projection printing wherein the printing light will be cut off at the proper time to obtain correct exposure of the printing paper, such control including light sensitive means positioned to receive light transmitted through the printing medium.

Other objects and advantages of the invention will appear from the following detailed description when read in connection with the accompanying drawing, wherein:

Figure 1 is a schematic diagram of the enlarger and easel used with the automatic control means of this invention; and Figure 2 is a schematic diagram of one embodiment of the invention.

Broadly, the time control of the light source of this invention is accomplished by causing the light to be transmitted through the printing medium to control an electronic relay system operated by light sensitive means such as a photoelectric tube of the electron multiplier type.

Specifically, referring to the drawings and particularly to Figure 1, numeral 1 represents an easel of substantially conventional type consisting of a substantially enclosed chamber provided with an aperture 2, in its upper surface. Positioned within the easel 1 and beneath aperture 2 is a light sensitive means 3, preferably of the electron multiplier type, and this tube will be referred to more in detail hereinafter. The upper surface of the easel is represented by the numeral 4, and on this surface there is to be placed a sheet of sensitized photo printing paper as used in a conventional projection printing process and indicated by the legend "Printing Paper" in Figure 1. A substantially light impervious chamber is represented by numeral 6 and positioned therein is a light source 7 connected with conventional plug-in prongs 8, and also within the housing 6 beneath the light source 7 there is positioned a carrier (not shown) adapted to receive the negative containing the image which is to be projected by means of projection-lens 9 onto the printing paper. The negative is indicated by the legend "Negative" in Figure 1.

As is well known, the exposure period required in photographic printing is primarily determined by the density of the negative in the enlarger 6 since the density controls the intensity of light falling on the electrodes 11 of the light sensitive means 3, the latter also being provided with the usual cathode 12, anode 13 and plurality of resistor means 14 connected in a bank between the various electrodes 11.

Referring more in detail to Figure 2, 20 represents a suitable transformer having its primary 21 adapted to be connected to the usual 115 volt A. C. source of supply upon closing of switch $S_1$. The secondary of the transformer 20 is divided as shown into a winding 23 for the filaments of tubes hereinafter to be described and a pilot light and a winding 22 which provides the principal source of voltage for the electronic circuit. Winding 22 is connected through a variable resistor 24 having a separate control arm 25 and through a ganged resistor unit 26 controlled by switch $S_2$ to the control electrodes 11 of the light sensitive means 3. The plate 13 of the light sensitive means is connected with a timing condenser C which, in turn, is connected to the cathode of a first control tube 31 which may be of any suitable pentode type, such as the RCA 6V6GT. The control grid of tube 31 is also directly connected to the plate of tube 3, and a voltage divider means 32 is connected in series with the cathode and screen grid of tube 31. As shown, the plate of tube 31 is connected directly to the control grid of a second control tube 34 which also may be of any suitable type such as RCA 2050, the control grid of the tube 34 having the usual grid leak resistance 35 and by-pass condenser 36. The output or plate of tube 34 is connected directly with a first relay means 37 of the single-pole double-throw type.

The switch box indicated at 33 comprises the switches $S_3$ and $S_4$ which are of the single-pole single-throw momentary contact type, the sockets 8' for the light prongs 8 being adapted to be connected in circuit upon the closing of switch $S_3$, and upon energization of a second relay means 41, the normally open and normally closed contacts of which are illustrated on the drawing. Switches $S_3$ and $S_4$ may be arranged to be controlled by the foot of the operator, and it is to be noted that one of the normally closed contacts of relay 41 is connected with a single-pole double-throw switch 43. Numeral 44 represents a ruby lamp that may be energized, as is readily apparent, regardless of whether or not relay 41 is de-energized or energized. The second relay 41 comprises the coil 41a and the three switches 41b, 41c and 41d, all of which are pivoted to swing from the full line positions shown to the dotted line positions. All of the switches 41b, 41c and 41d are connected to the coil 41a and move in unison as indicated by the dotted line 41e.

As is well known, all negatives encountered have several characteristics in common, regardless of their density, such as the areas of highlights and areas of shadow. The remainder of the negative is made up of graduated tones between the two extremes, and that tone approximately midway between the shadow and highlight is the tone which preferably should be received by the light sensitive means 3. Therefore, in operation, after the selected negative has been placed within the chamber 6 and the switches $S_3$ and $S_1$ closed, the light 7 is energized and the easel 1 is moved to a position such that the opening 2 is located in an area of middle tone of the projected image, and following this, the printing paper is placed on the upper surface 4. Switch $S_3$ may now be released, and assuming no test printing is advisable or required, the operation of the electronic circuit may continue.

Upon the closing of switch $S_4$, relay 41 is energized, and the normally open contacts are maintained closed even though there is only momentary actuation of switch $S_4$. This results, as is clearly apparent from the drawing, in voltage being applied to the cathode of light sensitive means 3 and to light source 7. It is assumed at this point of discussion that the variable resistor elements represented by the numerals 24 and 26 have been adjusted to their selected variations which provide maximum operating benefits with the paper being used. In this connection, it might be mentioned that the housing containing the electronic circuit is provided with dial settings mounted on the exterior thereof and manually adjustable for varying resistances 24 and 26. In other words, before printing takes place, it may be advisable when a different paper is employed to make a test print for the purpose of setting to optimum values the resistance of resistors 24, 26. It is readily apparent that, since the sensitivity of light sensitive means 3 is proportional to the amount of voltage applied to its cathode, resistance 24 and 26 provides a control whereby the sensitivity of the timer may be synchronized with the sensitivity of a given projection printing paper. As to the potentiometer 32, this may be adjusted to vary the voltage on the screen grid of first control tube means 31, and this provides a fine adjustment to the overall sensitivity of the times circuits and is used to align the timer under varying conditions in different type dark rooms.

When voltage is applied to the light source 7, light therefrom passes through the negative and projection paper to the tube 3 causing plate voltage to flow therefrom, said voltage providing a rise of voltage on the control grid of tube 31. The rate of rise of the voltage on the control grid of tube 31 is controlled and regulated by the charging rate of timing condenser C, and it is apparent that when the voltage on the grid of tube 31 has risen sufficiently, the plate voltage of this tube is blocked, which, in turn, results in removal of voltage from the control grid of tube 34. At this instant, plate voltage is admitted from tube 34 which voltage energizes the coil 37a of relay 37 which results in closing the switch 37b which is connected to the coil 37a as indicated by the dotted line 37c and as is apparent from the drawing, to de-energize relay 41. Upon the de-energization of relay 41, voltage is removed from light source 7 and from the cathode of light sensitive means 3, and it can be seen that the de-energization of relay 41 also functions to close a circuit shorting timing condenser C and thereby returning it to a state of zero voltage.

From the above, it can be seen that since the voltage output of light sensitive means 3 is directly proportional to the intensity of light falling on its electrodes, and since the rate of charge of timing condenser C is directly proportional to the output voltage of tube 3, the circuits function as a timing device for photographic projection printing, the printing time or exposure time being automatically dependent upon the density of the negative in the enlarger 6.

By way of interest, upon the closing of switch $S_3$, primary voltage is shunted around various components of the timing circuit; and, in addition, this switch, upon closing, supplies voltage to the enlarging lamp 7 to turn the lamp on for focusing. It is apparent that various adaptations may be added to the apparatus, such as jeweled light in the foot switch assembly of switches $S_3$ and $S_4$ for the purpose of facilitating its location on the dark room floor. Also, for example, instead of locating the electrodes of light sensitive means 3 directly beneath opening 2, the tube may be located away from the opening, and the light passing through the printing paper may be transmitted to the grids by the use of a cast rod of "Lucite," a methyl methacrylate resin.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:

1. In a photographic printing apparatus, a condenser the rate of charge of said condenser determining the printing exposure interval, light sensitive means activated in accordance with the printing intensity for governing the rate of charge of said condenser, means for terminating the exposure when the condenser has been charged to a certain value, said last named means including first and second relays and first and second control tubes each having at least a plate, a cathode, and a control grid, said condenser being permanently connected to the plate of the first control tube and said light sensitive means, and the plate of said first control tube being directly connected to the control grid of the second tube whereby the second tube has output voltage when the output of said first tube is blocked, the charge on said condenser controlling the output of said first tube, said first relay controlling, when energized, the operation of said light sensitive means, means to energize said first relay, said second relay being connected in the plate circuit of said second tube and being normally energized by the output voltage thereof, said second relay, upon energization, causing deenergization of said first relay.

2. Apparatus for the automatic control of a light source, a condenser, the rate of charge of the condenser determining energization or de-energization of said light source, light sensitive means activated in accordance with the light source intensity for governing the rate of charge of the condenser, means for terminating energization of said light source when the condenser has been charged to a certain value, said last named means including first and second relays and first and second control tubes each having at least a plate, a cathode, and a control grid, said condenser being permanently connected to the plate of the first control tube and said light sensitive means, and the plate of said first control tube being directly connected to the control grid of the second tube whereby the second tube has output voltage when the output of said first tube is blocked, the charge on said condenser controlling the output of said first tube, said first relay controlling, when energized, the operation of said light sensitive means, means to energize said first relay, said second relay being connected in the plate circuit of said second tube and being normally energized by the output voltage thereof, said second relay, upon energization, causing de-energization of said first relay.

References Cited in the file of this patent

UNITED STATES PATENTS

| | | |
|---|---|---|
| 1,939,243 | Twyman | Dec. 12, 1933 |
| 2,258,994 | Merriman | Oct. 14, 1941 |
| 2,293,425 | Dammond | Aug. 18, 1942 |
| 2,298,344 | Burnham | Oct. 13, 1942 |
| 2,417,023 | Sweet | Mar. 4, 1947 |
| 2,463,985 | Linde | Mar. 8, 1949 |
| 2,561,535 | Paulet | July 24, 1951 |
| 2,607,266 | Rabinowitz | Aug. 19, 1952 |
| 2,654,858 | Feller | Oct. 6, 1953 |
| 2,666,858 | Levine | Jan. 19, 1954 |
| 2,668,474 | Rogers | Feb. 9, 1954 |
| 2,749,799 | Strem | June 12, 1956 |